C. R. WEIL.
CONNECTION OF METALLIC AND OTHER FLEXIBLE TUBING.
APPLICATION FILED FEB. 24, 1919.

1,367,932.                                                Patented Feb. 8, 1921.

INVENTOR
CHARLES RICHARD WEIL
By
Attorney

UNITED STATES PATENT OFFICE.

CHARLES RICHARD WEIL, OF BATTERSEA, ENGLAND.

CONNECTION OF METALLIC AND OTHER FLEXIBLE TUBING.

1,367,932.   Specification of Letters Patent.   Patented Feb. 8, 1921.

Application filed February 24, 1919. Serial No. 278,961.

*To all whom it may concern:*

Be it known that I, CHARLES RICHARD WEIL, a subject of the King of Great Britain and Ireland, and a resident of Battersea, county of Surrey, England, have invented a certain new and useful Improvement in Connections of Metallic and other Flexible Tubing, for which I have obtained a patent in Great Britain, No. 116,868, dated 25th February, 1918, of which the following is a specification.

This invention relates to improved means of fitting connecting joints to the ends of metallic or flexible gas, or the like, tubing.

I propose to fit upon the end of metallic or like tubing, a piece of rubber tube, hereinafter termed rubber insertion; I then have a straight metal socket with end or ends slotted; the tubing, with rubber insertion attached, is fitted into the metal socket, and the end of socket is closed in at the slots with pliers or such like tool, compressing rubber insertion between tubing and metallic socket.

Figure 1:
Figure 2:
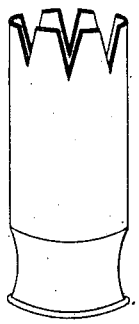
Figure 3:
Figure 4:
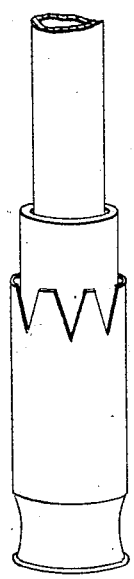
Figure 5:
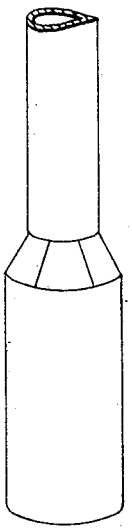

To better describe my invention, I furnish drawings of the different articles and their processes. Figure 1 shows rubber insertion. Figs. 2 and 3 are metal cases. Fig. 4 shows metallic or like tubing, with rubber insertions attached, partly inclosed inside metal case. Fig. 5 shows connecting joint fitted complete to metallic or the like tubing. I take the standard sizes of metallic or the like tubing, with sufficient margin between the metal casing and size of tubing, to supply the means of compression obtained with the rubber insertion when fitted to tubing and inclosed in case. Metal cases are made with adaptable screwed ends for joining lengths of tubing or to make push-on connections to pipes or fittings.

Having now described my invention, what I claim as new and desire to secure by Letters Patent of the United States is:—

1. A device for connecting tubular members including an elastic bushing adapted to receive within the opposite ends of its bore the tubular members to be connected, a tubular casing telescopically fitting over and covering said bushing and having an end portion provided with slits to facilitate the deformation thereof and cause the bushing to be compressed against the members to be connected.

2. A device for connecting tubular members including an elastic bushing of uniform wall-thickness and adapted to receive the tubular members to be connected in opposite ends thereof, a tubular metallic casing for telescoping over and surrounding the elastic bushing and having an end portion thereof formed to be contractible to thereby compress the elastic bushing against the end of the tubular members to be connected.

In testimony whereof I have affixed my signature hereto this 3rd day of February 1919.

CHARLES RICHARD WEIL.